(No Model.)
R. GRISWOLD.
SECTIONAL THATCH.
No. 372,465. Patented Nov. 1, 1887.
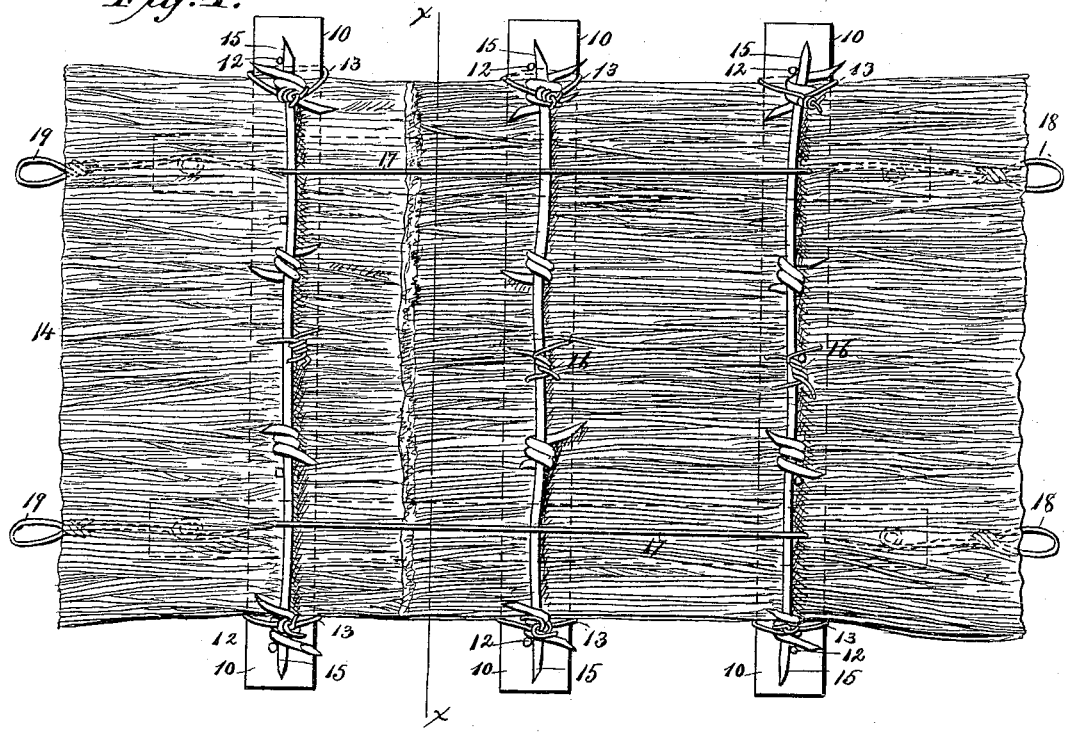
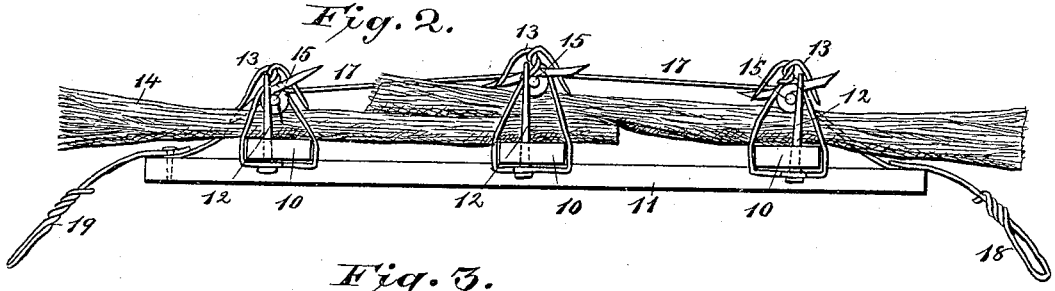
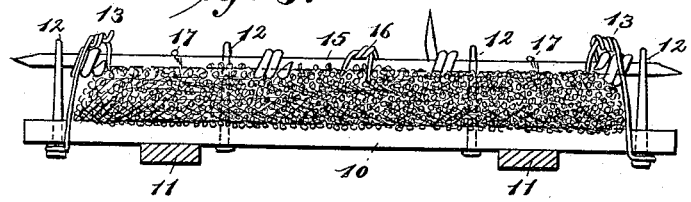
WITNESSES:
George Binkenburg
C. Sedgwick
INVENTOR:
R. Griswold
BY Munn & Co.
ATTORNEYS.

UNITED STATES PATENT OFFICE.

ROBERT GRISWOLD, OF WOODY, KANSAS.

SECTIONAL THATCH.

SPECIFICATION forming part of Letters Patent No. 372,465, dated November 1, 1887.

Application filed May 18, 1887. Serial No. 238,612. (No model.)

*To all whom it may concern:*

Be it known that I, ROBERT GRISWOLD, of Woody, in the county of Lincoln and State of Kansas, have invented a new and Improved Sectional Thatch, of which the following is a full, clear, and exact description.

This invention relates to a novel form of sectional thatch that is applicable for use in the covering of most any form of building, but which is more especially designed for use as a cover of ricks and stacks, the invention consisting of the novel form of thatch to be hereinafter described, and specifically pointed out in the claims.

Reference is to be had to the accompanying drawings, forming a part of this specification, in which similar figures of reference indicate corresponding parts in all the views.

Figure 1 is a plan view of a thatch section constructed in accordance with the terms of my invention. Fig. 2 is a side view of the section, and Fig. 3 is a cross-sectional view taken on line $x$ $x$ of Fig. 1.

In constructing such a thatch-section as the one illustrated in the drawings above referred to, I take any requisite number of strips 10 and lay them on the ground in proper positions to support longitudinal strips 11, which strips 11 are nailed or otherwise secured to the cross strips 10.

After the strips 10 and 11 have been secured together, as above described, I drive a number of nails, 12, through the strips 10, said nails serving as supports for the thatch-body and for the wires used to retain such body in position. Wires 13 are then bound about the heads of the outer nails, 12, and the frame constructed as above described is turned over. After the frame has been turned over the thatch 14 is applied, and this thatching is bound to place by the wires 13, which are brought into engagement with lengths of barbed wire 15, said lengths of barbed wire being placed above the strips 10 upon the upper face of the thatching. If desired, central binding-wires, 16, may be applied, as illustrated. Longitudinal wires 17 are secured to the ends of the strips 11 and passed up over the barbed wire 15, the ends of these wires being looped, as shown at 18 and 19.

In applying the thatch the upper loops, 18, are brought into engagement with any proper support that is secured to the ridge-pole, and weights are applied to the lower loops, 19, said weights acting to hold the thatch-sections in position.

The thatch-sections above described will be found to be exceedingly durable, and may be rapidly and easily made.

Having thus fully described my invention, I claim as new and desire to secure by Letters Patent—

1. The combination, with a frame made up of timbers 10 and 11, of thatching applied to the timbers 10, lengths of barbed wire 15, binding-wires 13, and longitudinal wires 17, substantially as described.

2. The combination, with a frame made up of timbers 10 and 11, of nails 12, driven through the timbers 10, thatching applied to the timbers 10, the nails 12, passing through the body of the thatching, lengths of barbed wire 15, applied to the face of the thatching, binding-wires 13, and longitudinal wires 17, substantially as described.

ROBERT GRISWOLD.

Witnesses:
ED. F. CODEL,
E. A. McFARLAND.